United States Patent [19]

Tsang et al.

[11] 4,270,887
[45] Jun. 2, 1981

[54] CLOSURE MECHANISM FOR TIRE CURING PRESS

[75] Inventors: David L. Tsang, Cobourg; Wlodzimierz I. Majewicz, Toronto, both of Canada

[73] Assignee: United Tire & Rubber Co. Limited, Rexdale, Canada

[21] Appl. No.: 147,340

[22] Filed: May 6, 1980

[51] Int. Cl.³ .............................................. B29H 5/02
[52] U.S. Cl. ...................................... 425/47; 425/25; 425/32
[58] Field of Search ........................ 425/17, 18, 19, 20, 425/21, 22, 23, 24, 25, 26, 28 R, 28 D, 29, 30, 31, 32, 33, 34, 35, 36, 37, 38, 39, 40, 41, 42, 43, 44, 45, 46, 47, 48, 49, 388, DIG. 48

[56] References Cited

U.S. PATENT DOCUMENTS

| | | | |
|---|---|---|---|
| 2,020,023 | 11/1935 | Flynn | 425/23 |
| 2,174,188 | 9/1939 | Heintz | 425/23 X |
| 2,638,629 | 5/1953 | Heintz | 425/25 |
| 2,745,137 | 5/1956 | Glynn | 425/43 X |
| 3,025,566 | 3/1962 | Kostur | 425/DIG. 48 |
| 3,154,814 | 11/1964 | Fike | 425/32 X |
| 3,764,051 | 10/1973 | Pinto et al. | 425/388 X |
| 4,018,551 | 4/1977 | Shuman | 425/388 |
| 4,097,035 | 6/1978 | Shuman | 425/388 X |

Primary Examiner—J. Howard Flint, Jr.
Attorney, Agent, or Firm—Fetherstonhaugh & Co.

[57] ABSTRACT

An improved clamping mechanism for clamping the cover to the base of a tire curing press is provided. The clamping mechanism includes a plurality of arms located at spaced intervals about the periphery of the base of the housing. Each arm is articulated about a joint located between its ends so that it is length adjustable between an extended configuration and a shortened configuration. A drive mechanism is provided for engaging the clamping arm to effect articulation about its joint to extend and shorten it as required in order to facilitate release of the cover from the base member in use.

9 Claims, 5 Drawing Figures

CLOSURE MECHANISM FOR TIRE CURING PRESS

This invention relates to tire curing presses. In particular, this invention relates to an improved clamping mechanism for clamping the cover to the base of the press.

The conventional tire curing press consists of a base portion and a removable cover portion which, in use, encloses a tire curing mold. The cover is generally secured with respect to the base by a plurality of clamping bolts or the like.

Considerable difficulty has been experienced in attempting to release the cover from the base after the tire curing operation has been completed. This difficulty results from the thermal expansion of the tire curing press which occurs due to the heating of the press during the curing operation.

The present invention provides a simple clamping mechanism which is easy to release and which facilitates the clamping operation.

It has been found that by using an articulated clamping arm, it is possible to obtain a substantially constant sealing load by initially applying a clamping load when the arm is bent so that when thermal expansion increases the load applied at the clamp, the arm may extend in length to maintain a substantially constant clamping force.

By pivotally mounting the clamping arms on the base and providing an extensible ram to move the arms about their pivotal connection with the base, it is possible to spread the arms outwardly from the base to facilitate the location of the cover on the base and thereafter pivot the arms inwardly to be operably located on the cover. This facilitates the closing of the tire curing press in use.

SUMMARY OF INVENTION

According to one aspect of the present invention, there is provided a tire curing press which comprises a housing which comprises a base member and a cover member adapted to cooperate with one another to form a tire curing chamber therein, a plurality of clamping arms located at spaced intervals about the periphery of said housing, each of said clamping arms having a first end pivotably mounted on one of said members and a second end adapted to be releasably connected to the other of said members, each of said arms being articulated about a joint located between said first and second ends so as to be length adjustable between an extended configuration to facilitate mounting and release of said second end and a shortened configuration to apply a clamping pressure urging said second end toward said first end, and drive means engaging each clamping arm and operable to effect articulation of each arm about its joint to extend and shorten its associated arm in use.

The invention will be more clearly understood after reference to the following detailed specification read in conjuction with the drawings, wherein, FIG. 1 is an exploded pictorial view of a tire curing press according to an embodiment of the present invention;

Figure 1:
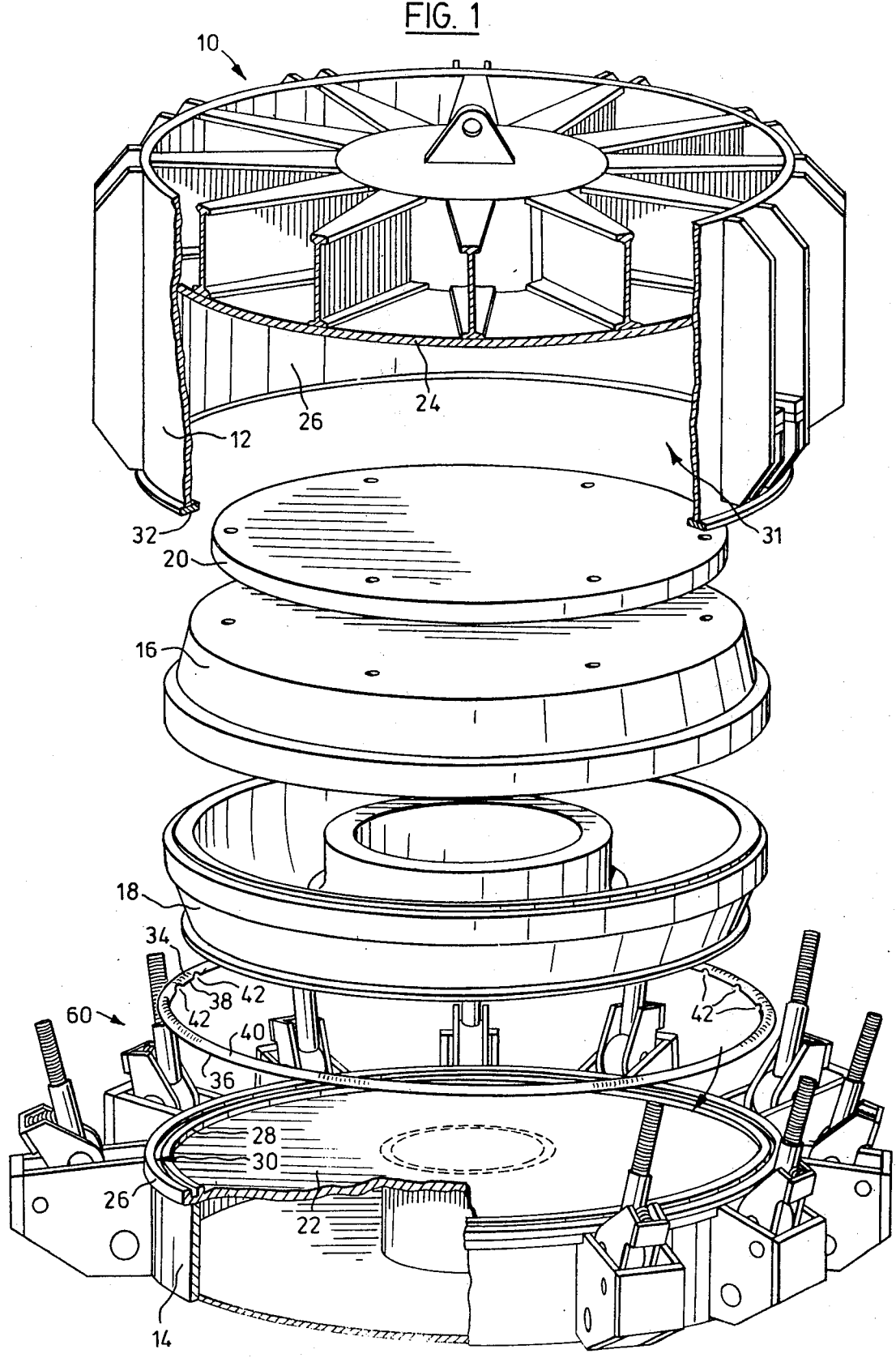

With reference to FIG. 1 of the drawings, the reference numeral 10 refers generally to a tire curing press constructed in accordance with an embodiment of the present invention. The press 10 includes a cover 12 and a base 14 which cooperate with one another to define a tire curing chamber 16 in the space formed within the cover 12. A tire curing mold consisting of a lower mold section 18 and an upper mold section 20 fits within the curing chamber 16 and a spacer plate 22 is provided to ensure that a closing load may be applied to the mold by the cover 12 in use. The cover 12 has a side wall 24 which defines the outer periphery of the curing chamber 22 and the base 14 has a peripheral side wall 26.

Figure 3:
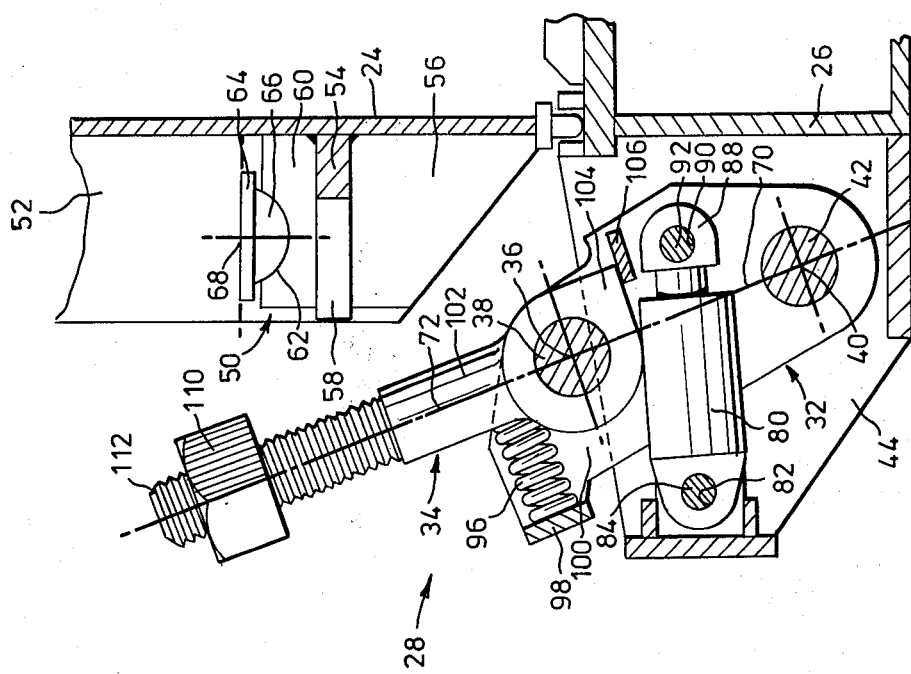
FIG. 3 is a sectional side view of a clamp assembly in a release position.

The cover 12 is releasably secured to the base 14 by a plurality of clamping arm assemblies 28 which are shown in the assembled configuration in FIG. 3. A clamping arm, generally identified by the reference numeral 30, consists of a first section 32 and a second section 34. The distal end of the first section 32 is pivotally connected to the proximal end of the second section 34 for rotation about a first transverse axis 36 by means of a pivot pin 38. The proximal end of the first section 32 is mounted to pivot about a second transverse axis 40 by means of a pivot pin 42 which is supported by support brackets 44 which project outwardly from the side wall 26 to provide a first mounting bracket. A second mounting bracket, generally identified by the reference numeral 50, is mounted on the side wall 24 of the cover between an adjacent pair of reinforcing webs 52. The second mounting brackets 50 each comprise a plate 54 which is welded to the side wall 24 of the cover and is supported by brace plates 56 which extend downwardly parallel to the oppositely disposed portions of the reinforcing plates 52. A U-shaped notch 58 is formed in the plate 54. Bearing blocks 60 are mounted above the plate 54 at opposite sides of the notch 58 and each have an arcuate shaped bearing seat 62. A pair of bearing pillows 64 each have an arcuate shaped projection 66 which is seated in the seat 62 for rotation about a third axis 68.

Figure 5:
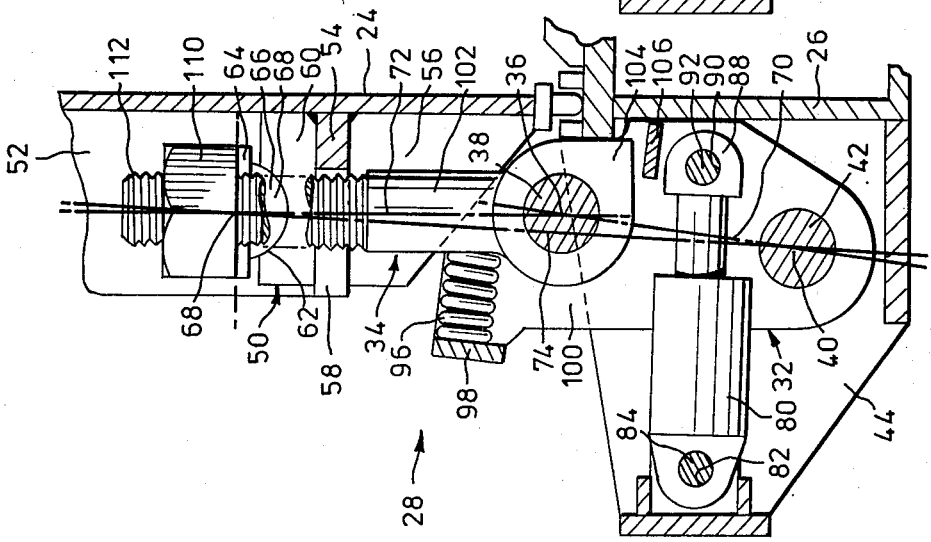
FIG. 5 is a sectional view of the clamp assembly of FIG. 3 in the clamping position.

As shown in FIG. 5 of the drawings, the first section 32 of the clamping arm has a first longitudinal axis 70 extending between the first transverse axis 36 and the second transverse axis 40. Similarly the second section 34 has a second longitudinal axis 72 extending between the first transverse axis 36 and the third transverse axis 68. A third longitudinal axis 74 extends between the second transverse axis 40 and the third transverse axis 68.

Movement of the clamping arms 28 is achieved by means of an expansible ram 80. The ram 80 has a mounting passage 82 at one end thereof pivotably mounted on a pivot pin 84 which is mounted in passages 86 formed in the brackets 44. The movable head 88 of the ram has a passage 90 mounted on a pivot pin 92 which is mounted in support passages 94 of the first section 32.

The rams 80 are connected in parallel to a pressurized source of hydraulic fluid.

Rotation of the second section 34 about the first transverse axis 36 is limited. A compression spring 96 is located between an end plate 98 which extends between the oppositely disposed side plates 100 of the first section 32. The other end of the spring 96 bears against the shaft 102 of the second section 34. The spring 96 normally urges the second section 34 to rotate about the first transverse axis 36 to drive the nose portion 104 into engagement with the stop plate 106.

A locking nut 110 is threadably mounted on the threaded end portion 112 of the second section 34.

Figure 2:
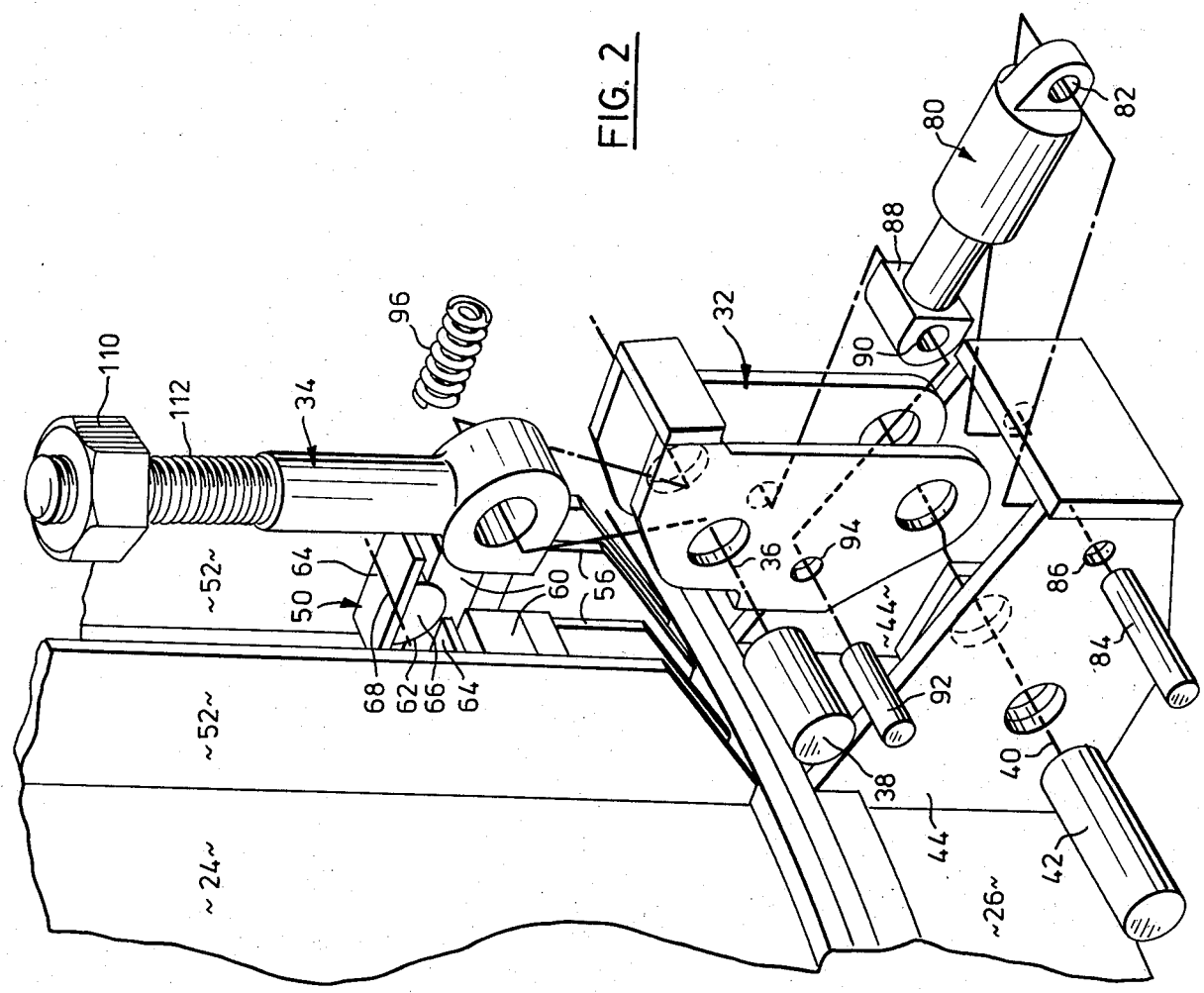
FIG. 2 is an exploded pictorial view of a clamp assembly.

In use, the rams 80 are initially in their shortened configuration illustrated in FIG. 3 of the drawings, in which position the compression springs 96 position the second section 34 so that the nose 104 is against the stop 106 and the axes 70 and 72 are axially aligned. In this position, as shown in FIG. 2, the clamping arms are spaced outwardly from the base a distance sufficient to provide clearance to permit the cover to be mounted on the base. When the cover is operably mounted on the base, the ram 80 is extended to the position shown in in FIG. 4. This movement is rotation about the transversely extending axis 40. The axes 70 and 72 remain aligned. This rotation positions the nut 110 on the bearing pads 64. It will be noted that by reason of the fact that the bearing members 66 may rotate about the third transverse axis 68, they will automatically align with the collar 116 as the arm 34 is moved from the position shown in FIG. 3 to the position shown in FIG. 4.

Continued extension of the ram 80 causes the arm 28 to articulate about the first axis 36 so that the distance between the second axis 40 and the third axis 68 is reduced, thereby effecting shortening of the arm and applying a clamping pressure clamping the cover to the base. When the hydraulic ram 80 is extended to apply the initial clamping load which is required, steam is admitted to the curing chamber. As a result of the introduction of high temperature steam to the curing chamber, the structure of the press expands. The system used for supplying hydraulic fluid to the rams 80 is such that the fluid is locked in the system when the rams are in their extended position shown in FIG. 5 with the result that thermal expansion of the press merely serves to increase the clamping load applied to the interface between the cover and the base.

Figure 4:
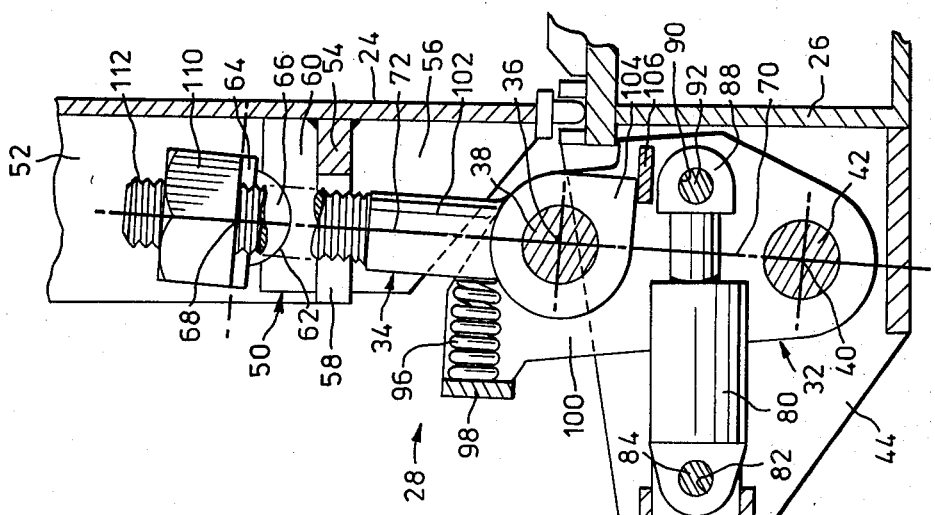
FIG. 4 is a sectional side view of the clamp assembly of FIG. 3 in an intermediate mounting position.

When the curing operation has been completed and while the press is still at an elevated temperature, it is possible to release the cover by activating the ram 80 to retract so that the clamping arm articulates to the position shown in FIG. 4 where it is at its fully extended length. The proportions of the clamp arm are such that the difference between the shortened length and the extended length achieved by articulation is sufficient to enable an adequate clamping load to be applied when the arm is in the shortened configuration while permitting release of the arm from the cover when in the extended configuration. Thus, further shortening of the ram 80 causes the clamping arm 30 to pivot about the second transverse axis 40 which returns the arm 30 to the position shown in FIG. 3. Thereupon, the cover may be removed from the base in the conventional manner to permit removal of the cured tire.

From the foregoing it will be apparent that the present invention provides a simple and efficient mechanism for obtaining a rapid release of the cover from the base of a tire press.

We claim:

1. A tire curing press comprising,
   (a) a housing which comprises a base member and a cover member adapted to cooperate with one another to form a tire curing chamber therein,
   (b) a plurality of clamping arms located at spaced intervals about the periphery of said housing, each of said clamping arms having a first end pivotably mounted on one of said members and a second end adapted to be releasably connected to the other of said members, each of said arms being adapted to bend upon itself about a joint located between said first and second ends so as to be length adjustable between an extended configuration to facilitate mounting and release of said second end and a shortened configuration to apply a clamping pressure urging said second end toward said first end, and
   (c) drive means engaging each clamping arm and operable to effect bending of each arm about its joint to extend and shorten its associated arm in use.

2. A tire curing press comprising,
   (a) a housing which comprises a base member and a cover member adapted to cooperate with one another to form a tire curing chamber therebetween,
   (b) a plurality of clamping arm assemblies located at spaced intervals about the periphery of said housing, each clamping arm assembly comprising,
   (i) first and second sections each having a proximal end and a distal end, the distal end of the first section being pivotally connected to the proximal end of the second section for angular movement about a first transverse axis, the proximal end of the first section being pivotally connected to the base for angular movement about a second transverse axis disposed below said first transverse axis, the distal end of the second section being releasably securable to said cover,
   (c) a drive means engaging each of said clamping arm assemblies and operable to effect articulating movement about said first axis whereby the distal end of the second section may be moved toward or away from the proximal end of the first section to effect shortening or extension of the arm assembly to clamp or release said housing members.

3. A tire curing press as claimed in claim 2 including adjustment means on said second section for adjusting the effective length thereof.

4. A tire curing press as claimed in claim 2 wherein the distal end of the second section is adapted to be pivotable about a third transverse axis when secured to said cover to facilitate shortening and extension of said arm assembly.

5. A tire curing press as claimed in claim 4 wherein said first and second sections have first and second longitudinal axes respectively which extend between the proximal and distal ends thereof and a third longitudinal axis extending between the proximal end of the first section and the distal end of the second section, said drive means being operable to move said first transverse axis away from said third longitudinal axis to effect shortening of said arm assembly and toward said third axis to lengthen said arm assembly.

6. A tire curing press as claimed in claim 5 wherein said drive means comprises an extensible ram having a first end connected to the base outwardly from said third longitudinal axis and a second end connected to said first section, said extensible ram being extensible to shorten said arm and retractable to extend said arm.

7. A tire curing press as claimed in claim 5 wherein each arm assembly is disposed adjacent a side wall of said housing and its associated first transverse axis is disposed between said third longitudinal axis and said side wall when in the shortened configuration whereby movement of said first transverse axis toward said third longitudinal axis causes angular movement of the distal end of the first section away from the adjacent side wall whereby upon release of said distal end of said second section the entire arm may be pivoted away from the side wall of the housing.

8. A tire curing press as claimed in claim 7 including means normally urging said second section to pivot about said first transverse axis in a direction toward said adjacent side wall and stop means for limiting the pivotal movement in the direction toward said adjacent side wall so that it does not exceed that which will permit axial alignment of the first and second longitudinal axes.

9. A tire curing press comprising,
(a) a housing which comprises a base adapted to support a tire curing mold and a cover which is adapted to releasably engage the base to form a tire curing chamber therebetween,
(b) a plurality of first mounting brackets on said base at spaced intervals about the periphery of said housing,
(c) a plurality of second mounting brackets mounted on and projecting outwardly from a side wall of said cover and arranged to be aligned one with each first mounting bracket of said base, each second mounting bracket having a transversely extending seat which has an arcuate cross-sectional configuration,
(d) a plurality of clamping arms, one for each first mounting bracket, each clamping arm comprising,
(i) first and second sections each having a proximal end and a distal end,
(ii) means pivotally connecting the distal end of the first section to the proximal end of the second section for angular movement about a first transverse axis,
(iii) means pivotally connecting the proximal end of the first section to one of said first mounting brackets for angular movement about a second transverse axis disposed below said first transverse axis,
(iv) releasable clamping means at the distal end of said second section adapted to be releasably seated in said transversely extending seat for angular movement about a third transverse axis disposed above said first transverse axis,
(v) said first and second sections having first and second longitudinal axes respectively which extend between the proximal and distal ends thereof and a third longitudinal axis which extends between said second transverse axis and the third transverse axis,
(e) a plurality of extensible rams, one for each clamping arm, each ram having one end pivotally mounted on a first mounting bracket outwardly from said third longitudinal axis and a second end pivotally mounted on said first section above said second transverse axis, said ram being extensible to locate said first transverse axis between said third longitudinal axis and the adjacent side wall of the cover in use to apply a shortening load to said clamping arm urging said cover to a closed position on said base, and said ram being retractable to move the first transverse axis toward said third longitudinal axis to extend said clamping arm and thereby reduce the clamping load applied between said cover and said base to facilitate the release of said release means,
(f) means normally urging said second section to be displaced angularly with respect to said first section about said first transverse axis in a direction toward the adjacent side wall of the cover and stop means for limiting said angular displacement in said direction to that required to locate said first transverse axis in the plane of said third longitudinal axis whereby said arm is normally urged to its maximum length configuration when free from said cover.

* * * * *